(12) United States Patent
Taketa et al.

(10) Patent No.: US 11,473,624 B1
(45) Date of Patent: Oct. 18, 2022

(54) BEARING LUBRICATION SYSTEM AND METHOD OF LUBRICATING A DUPLEX BEARING

(71) Applicants: Rolls-Royce Corporation, Indianapolis, IN (US); Rolls-Royce North American Technologies Inc., Indianapolis, IN (US)

(72) Inventors: Jared Taketa, Indianapolis, IN (US); Caleb Camara, Indianapolis, IN (US); Grant Wible, Indianapolis, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 0 days.

(21) Appl. No.: 17/322,500

(22) Filed: May 17, 2021

(51) Int. Cl.
*F16C 33/66* (2006.01)
*F16C 33/60* (2006.01)
*F16C 19/18* (2006.01)

(52) U.S. Cl.
CPC ........ *F16C 33/6659* (2013.01); *F16C 19/183* (2013.01); *F16C 33/60* (2013.01); *F16C 33/6681* (2013.01)

(58) Field of Classification Search
CPC ........ F16C 19/08; F16C 19/18; F16C 19/181; F16C 19/183; F16C 33/405; F16C 33/60; F16C 33/6659; F16C 33/6662; F16C 33/6674; F16C 33/6687
See application file for complete search history.

(56) References Cited

U.S. PATENT DOCUMENTS

| 3,885,842 | A | * | 5/1975 | Furutsu | F16C 33/60 |
| | | | | | 384/468 |
| 5,009,523 | A | * | 4/1991 | Folger | F16C 35/061 |
| | | | | | 384/571 |
| 9,541,137 | B2 | * | 1/2017 | Mori | F16C 19/546 |
| 9,897,140 | B2 | | 2/2018 | Gorajski et al. | |
| 2007/0086689 | A1 | | 4/2007 | Qiu et al. | |
| 2016/0201727 | A1 | * | 7/2016 | Wild | F16C 35/042 |
| | | | | | 29/898.1 |

FOREIGN PATENT DOCUMENTS

CN          204942267          1/2016

OTHER PUBLICATIONS

Flouros et al., "Active Outer Ring Cooling of High Loaded and High Speed Ball Bearings," *Journal of Engineering for Gas Turbines and Power*, 135 (2013) pp. 081902-1 to 081902-8.

\* cited by examiner

*Primary Examiner* — James Pilkington
(74) *Attorney, Agent, or Firm* — Crowell & Moring LLP

(57) ABSTRACT

A bearing lubrication system includes a bearing assembly comprising a duplex bearing including an outer ring, an inner ring positioned radially inward from the outer ring, and two sets of circumferentially distributed rolling elements between the inner and outer rings. The bearing assembly further includes a housing radially surrounding the duplex bearing and including a lubricant flow passage in fluid communication with a source of lubricant. A flow orifice is located downstream of the lubricant flow passage for jetting the lubricant into the duplex bearing. The flow orifice has an axial location between the two sets of rolling elements.

19 Claims, 9 Drawing Sheets

BEARING LUBRICATION SYSTEM AND METHOD OF LUBRICATING A DUPLEX BEARING

GOVERNMENT LICENSE RIGHTS

This invention was made with government support under contract number W911W6-19-9-0005 awarded by the Department of the Army. The government has certain rights in the invention.

TECHNICAL FIELD

This disclosure relates generally to bearings and more particularly to an improved method and configuration for lubricating duplex bearings.

BACKGROUND

Duplex bearings have been in use for many years. Most are lubricated with grease, oil or oil mist and may support rotors used in many different kinds of machinery. In gas turbines and associated transmission components, recirculating oil may be used not only to provide lubricating and cooling, but also to wash away debris that may be generated during bearing failure. With increasing operating conditions that lead to higher heat generation, duplex bearings may require a recirculating oil system to function reliably. Typically, duplex bearings are lubricated via oil jetted into one side of the bearing along an axial direction with respect to the rotor. In some cases, two opposing oil jets may be employed. In aircraft applications, weight and/or size reduction is desirable if not critical. The redesign of components such as bearings to reduce axial size and weight may be beneficial.

DRAWINGS

In order that the disclosure may be well understood, there will now be described various forms thereof, given by way of example, reference being made to the accompanying drawings, in which.

Figure 7:
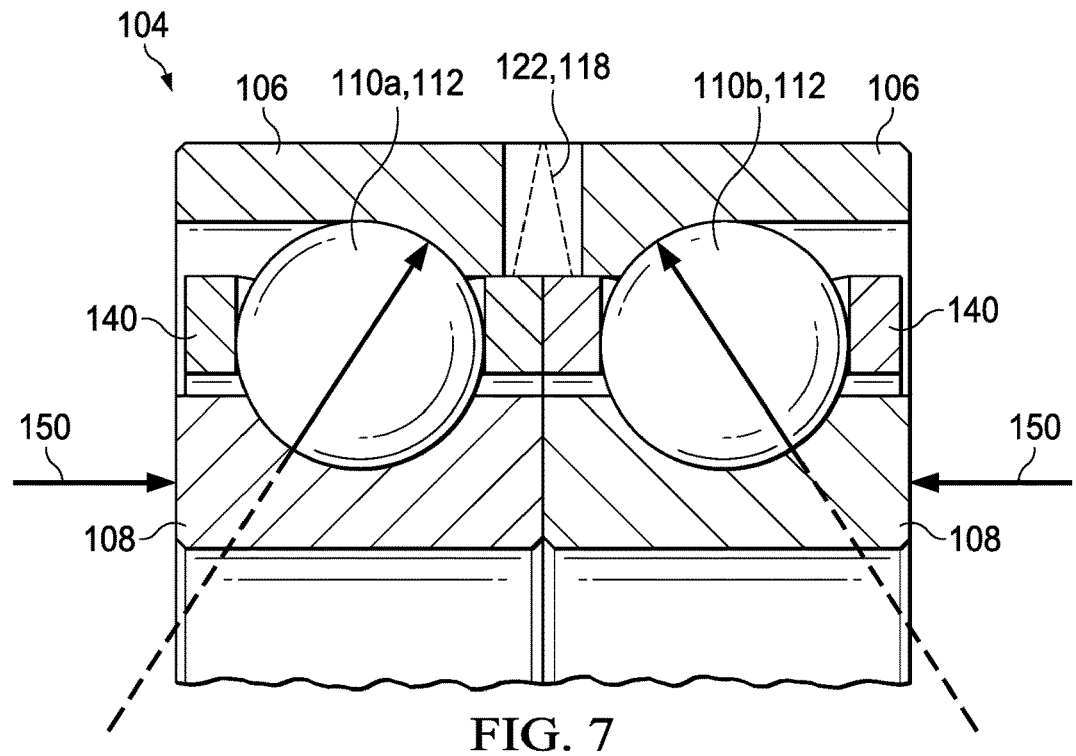

FIG. 7 provides a close-up transverse cross-sectional view of part of the duplex bearing showing an exemplary angular contact arrangement of the rolling elements.

The drawings described herein are for illustration purposes only and are not intended to limit the scope of the present disclosure in any way.

DETAILED DESCRIPTION

A bearing lubrication system that allows for effective lubrication and cooling of a duplex bearing while utilizing reduced axial space compared to conventional lubrication approaches has been developed. In addition, the new bearing lubrication system may also improve lubricant targeting/capture efficiency, which can be difficult with conventional external jets. The duplex bearing may be part of a clutch subsystem for an aircraft or used in another rotary device.

Figure 1A:
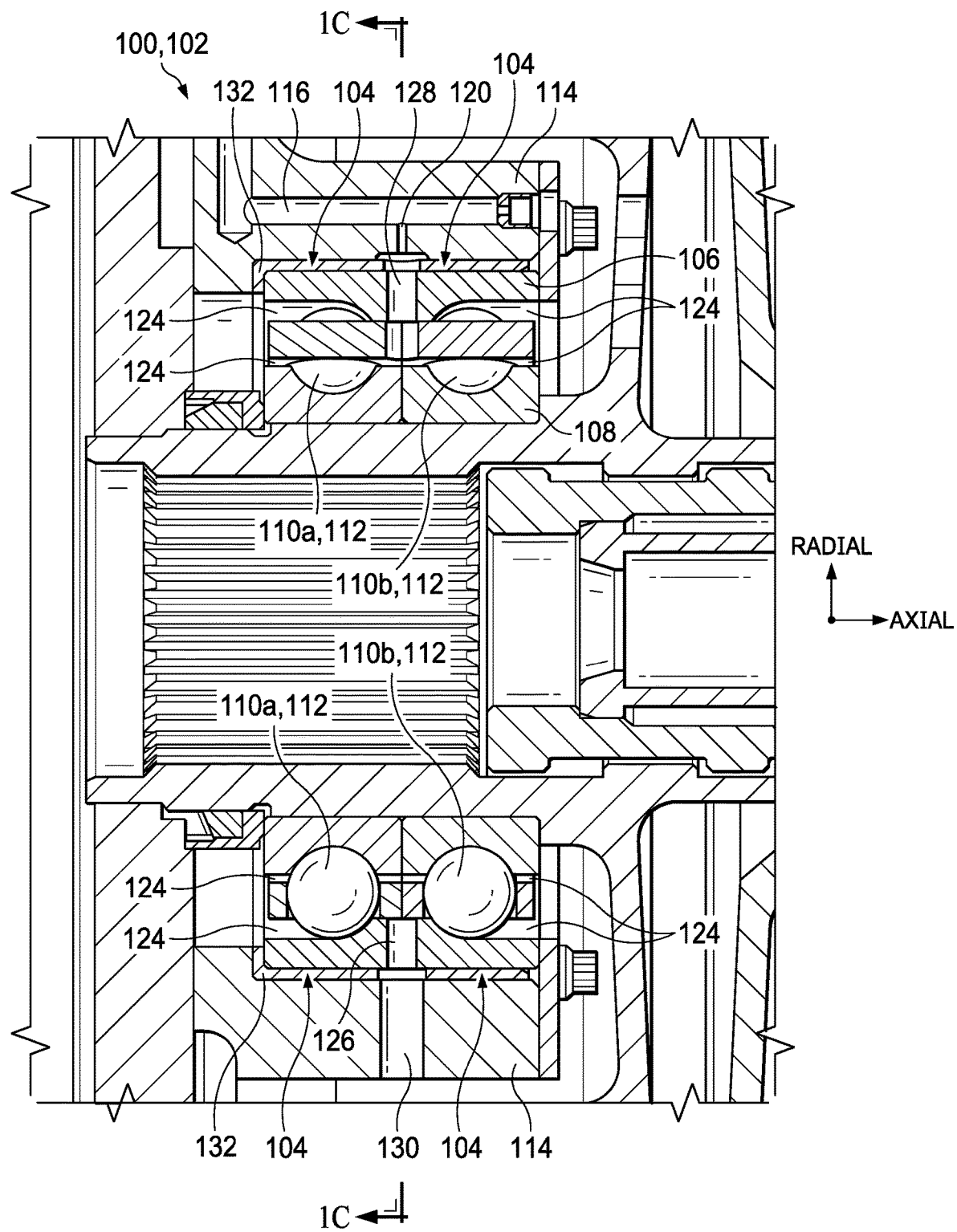
FIG. 1A shows a transverse cross-sectional view of the bearing lubrication system, which includes a bearing assembly comprising a duplex bearing positioned on a rotatable shaft.
Figure 1B:
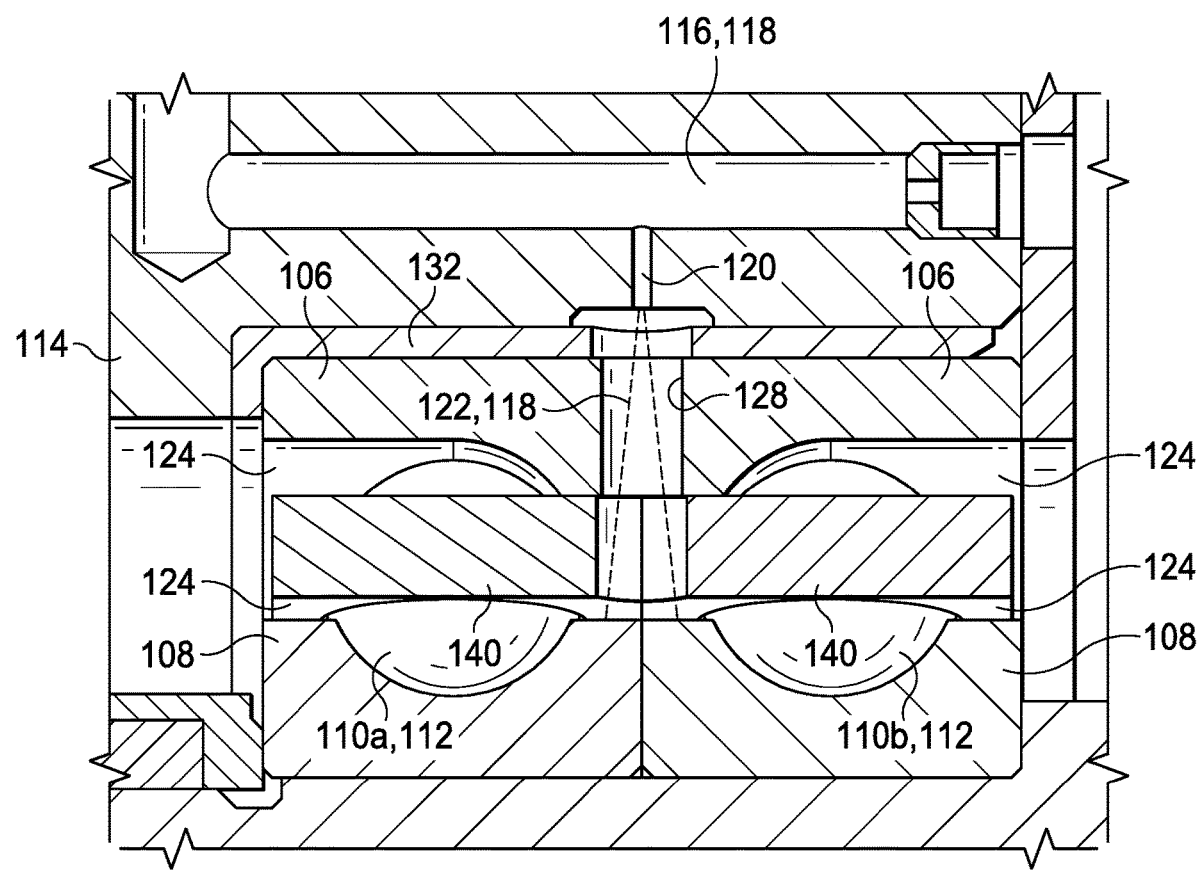
FIG. 1B shows a close-up transverse cross-sectional view of part of the bearing lubrication system of FIG. 1A, where a flow orifice for forming a lubricant jet is positioned in a housing radially surrounding the duplex bearing.

FIG. 1A shows a transverse cross-sectional view of the bearing lubrication system, which includes a bearing assembly comprising a duplex bearing positioned on a rotatable shaft, where axial and radial directions are as indicated. FIG. 1B shows a close-up transverse cross-sectional view of part of the bearing lubrication system, and FIG. 1C shows a longitudinal cross-sectional view, where the axial direction is normal to the page.

Figure 1C:
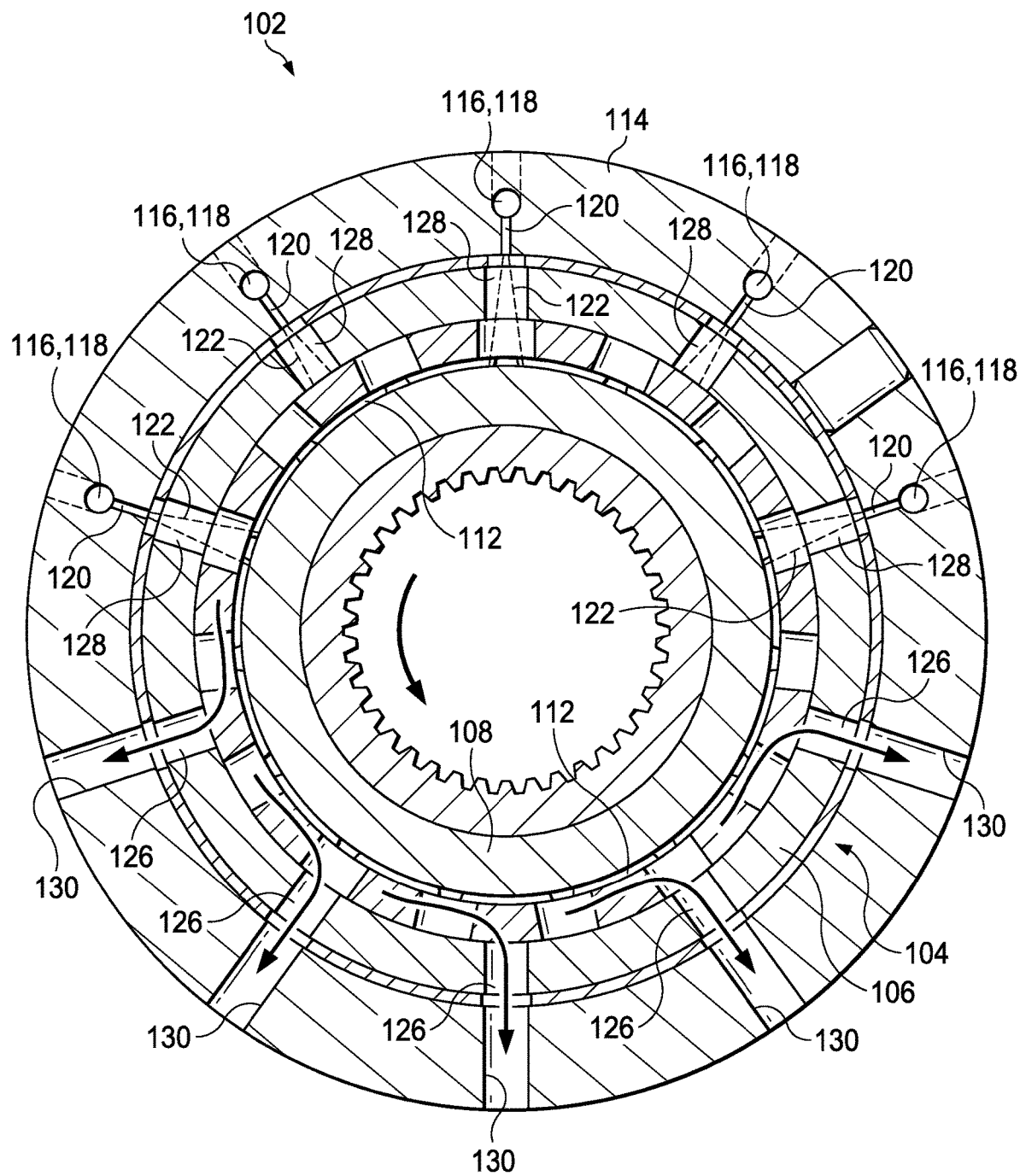
FIG. 1C shows a longitudinal cross-sectional view of the bearing lubrication system of FIG. 1A, where an axial direction is normal to the page.

Referring to FIGS. 1A-1C, the bearing lubrication system 100 includes a bearing assembly 102 comprising a duplex bearing 104 including an outer ring 106, an inner ring 108 positioned radially inward from the outer ring 106, and two sets 110a,110b of circumferentially distributed rolling elements (e.g., balls or rollers) 112 between the inner and outer rings 108,106. A housing 114 radially surrounds the duplex bearing 104. A liner 132 may be positioned between the housing 114 and the duplex bearing 104. The housing 114 includes a lubricant flow passage 116 in fluid communication with a source of lubricant 118. As can be seen in the close-up view of FIG. 1B, a flow orifice 120 is located downstream of the lubricant flow passage 116 for jetting the lubricant 118 into the duplex bearing 104. The flow orifice 120 has an axial location between the two sets 110a,110b of rolling elements 112, and may be centered between the two sets 110a,110b of rolling elements 112, as shown. By forcing the lubricant 118 in the flow passage 116 through the flow orifice 120 in the bearing assembly 102, a lubricant jet 122 is formed and jetted into the bearing 104. In this example, the lubricant jet 122 passes through an entrance slot 128 in the outer ring 106. Advantageously, the lubricant 118 is apportioned throughout the duplex bearing 104 to promote effective lubrication and cooling. The duplex bearing 104 may be configured to facilitate pumping of the lubricant 118 from between the sets 110a,110b of rolling elements 112 toward opposing axial directions, as discussed further below, to promote distribution of the lubricant throughout the duplex bearing 104. The bearing assembly 102 may include a plurality of the flow orifices 120 and the entrance slots 128 to facilitate dissemination of the lubricant 118, as shown in FIG. 1C. The flow orifices 120 may be spaced apart from each other ("clocked") as desired and/or may be preferentially located in the upper portion of the bearing assembly 102. Similarly, the entrance slots 128 may be spaced apart from each other (clocked) as desired and/or preferentially located in the upper portion of the bearing assembly 102.

The flow orifice 120 may alternatively be described as a flow constriction or flow restrictor. To form the lubricant jet 122, the flow orifice 120 typically has an inner diameter that is several times smaller than that of the upstream lubricant flow passage 116. More specifically, the inner diameter of the flow orifice 120 is small enough to yield a pressurized jetted stream that meets the cooling and lubrication requirements of the duplex bearing 104.

Spent lubricant 118 may be removed from the duplex bearing 104 through one or more exit slots 126 in the outer ring 106 and/or through side gaps 124 between the outer and inner rings 106,108. The exit slot(s) 126 in the outer ring 106 may be in fluid communication with exit passageways 130 in the housing 114 to expel the spent lubricant 108 from the bearing assembly 102. The bearing assembly 102 may include a plurality of the exit slots 126 and exit passageways 130, as shown in FIG. 1C, to facilitate removal of spent (hot and/or dirty) lubricant 118. The exit slots 126 may be spaced apart from each other (clocked) as desired and/or may be prefererentially located in the lower portion of the bearing assembly 102. Similarly, the exit passageways 130 may be spaced apart from each other (clocked) as desired and/or preferentially located in the lower portion of the bearing assembly 102.

The phrase that a first component is "in fluid communication with" a second component may be understood to mean that fluid can flow between and/or through the first and second components. For a second component described as being "downstream of" a first component, it may be understood that the first and second components are in fluid communication with each other, and further that fluid typically or always flows from the first component to the second component. In this situation, the first component may be described as being "upstream of" the second component.

Figure 1D:
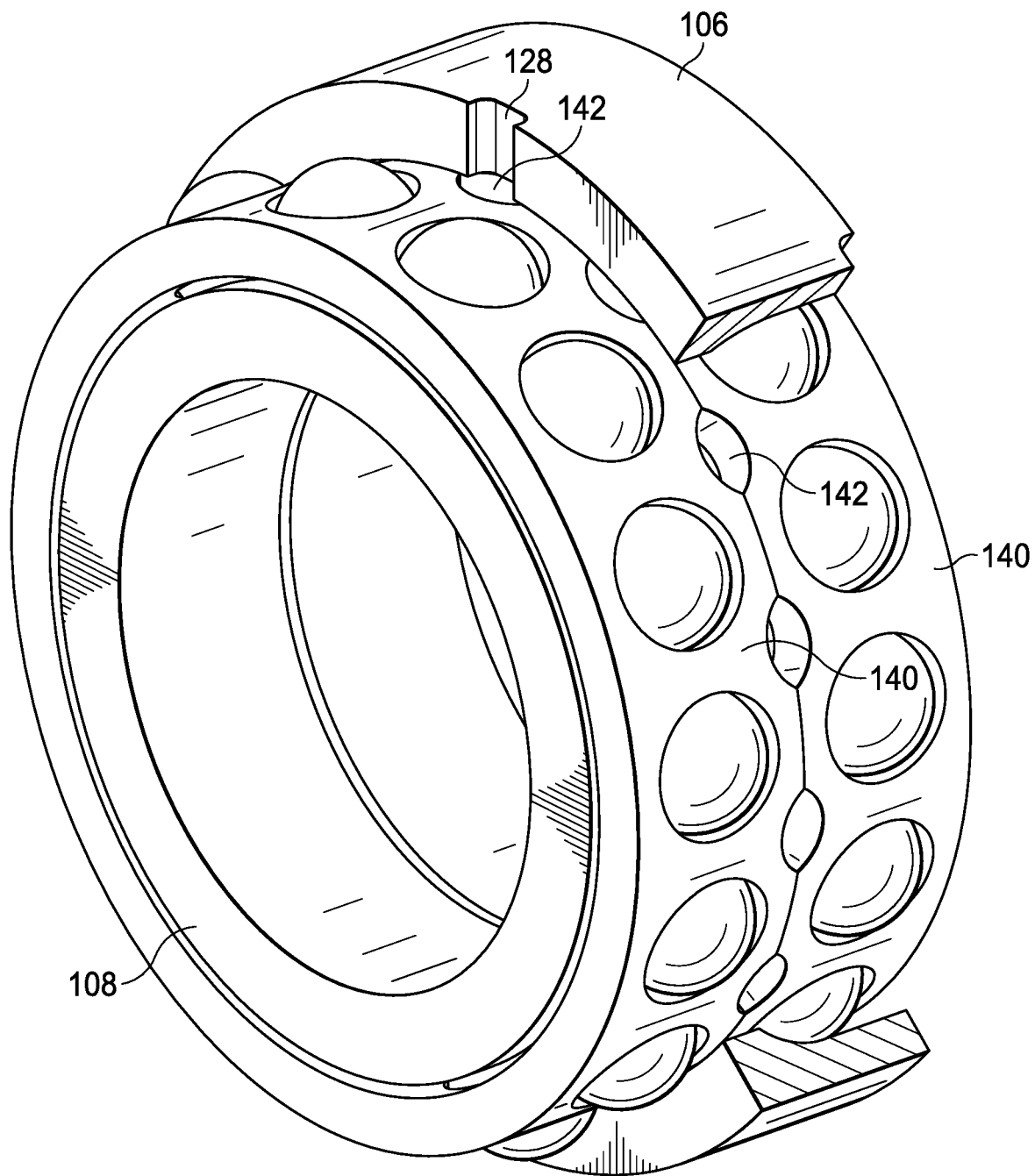
FIG. 1D shows a perspective cut-away view of part of the duplex bearing shown in FIG. 1B.

Referring to the cutaway perspective view of FIG. 1D, the duplex bearing 104 may further comprise an annular cage 140 between the inner and outer rings 108,106 for maintaining a predetermined axial and circumferential spacing between the rolling elements 112. The annular cage 140 may include a plurality of circumferentially distributed thru-holes or "scallops" 142 through which the lubricant jet 122 may pass to reach the inner ring 108. As can be seen from FIG. 1D, the thru-holes 142 may come in to alignment with the entrance slot(s) 128 in the (static) outer ring 106 as the cage 140 rotates during operation. The thru-holes 142 have an axial location between the two sets 110a,110b of rolling elements 112, and may be centered between the two sets 110a,110b of rolling elements 112, as shown.

Figure 2:
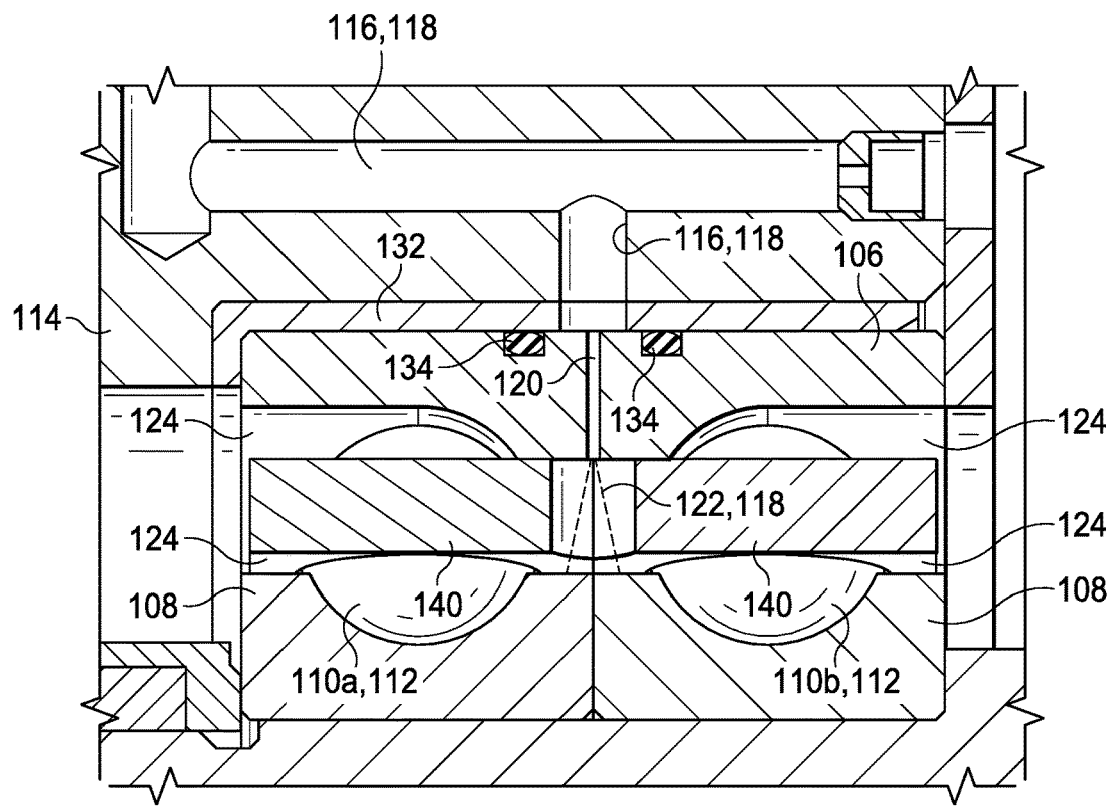
FIG. 2 shows a close-up transverse cross-sectional view of part of an exemplary bearing lubrication system, where a flow orifice for forming a lubricant jet is positioned in an outer ring of the duplex bearing.
Figure 3:
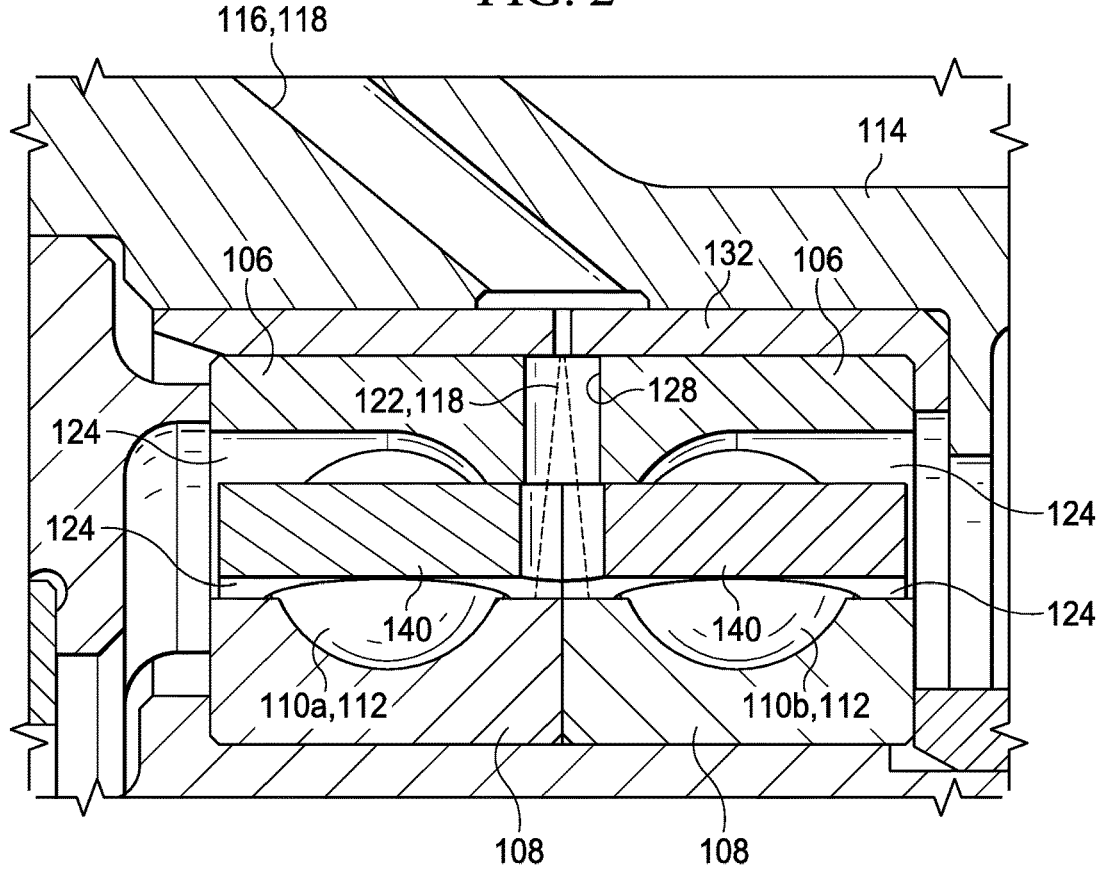
FIG. 3 shows a close-up transverse cross-sectional view of part of an exemplary bearing lubrication system, where a flow orifice for forming a lubricant jet is positioned in a liner between the outer ring and the housing.

In the embodiment of FIGS. 1A-1C, the flow orifice 120 is located in the housing 114 and upstream of an entrance slot 128 in the outer ring 106. In other embodiments, as shown in FIGS. 2 and 3, the flow orifice 120 may be located in the outer ring 106 or in a liner 132 between the housing 114 and the outer ring 106. Each of these alternative embodiments may provide improved lubricant targeting efficiency when compared to conventional external jets. In addition, conventional jet orifices may have minimum length requirements to provide a smooth jet instead of a spray or mist, but that requirement is relaxed here since the lubricant is jetted directly into the duplex bearing 104. Thus, the flow orifice 120 may be positioned even in the liner 132, which can accommodate only a relatively short orifice length. Referring to FIG. 2, where the flow orifice 120 is located in the outer ring 106, a seal 134 may further be incorporated between the liner 132 and the outer ring 106 to prevent leakage of the lubricant 118. In this embodiment, some or all of the thru-holes 142 in the annular cage 140 may align with the flow orifice(s) 120 during operation, and the lubricant jet 122 may be jetted directly into the thru-holes 142. In the embodiment of FIG. 3, where the flow orifice 120 is located in the liner 132 between the housing 114 and the outer ring 106, the outer ring 106 includes an entrance slot 128 downstream of the flow orifice 120, as in the embodiment of FIGS. 1A-1D. As above, some or all of the thru-holes 142 in the annular cage 140 may align with the entrance slots 128 in the outer ring 106 during operation, facilitating jetting of the lubricant 118 into the duplex bearing 104 to access the inner ring 108.

As shown in FIG. 1C, a longitudinal axis of the flow orifice 120 may be aligned with a radial direction of the duplex bearing 104. In addition, the entrance slots 128 in the outer ring 106 and the thru-holes 142 in the annular cage 140 may be aligned with the radial direction; that is, the longitudinal axis of each entrance slot 128 and/or thru-hole 142 may be aligned with the radial direction. Analogously, the exit slots 126 in the outer ring 106 and the exit passageways 130 in the housing 114 may have a longitudinal axis aligned with the radial direction.

Figure 4A:
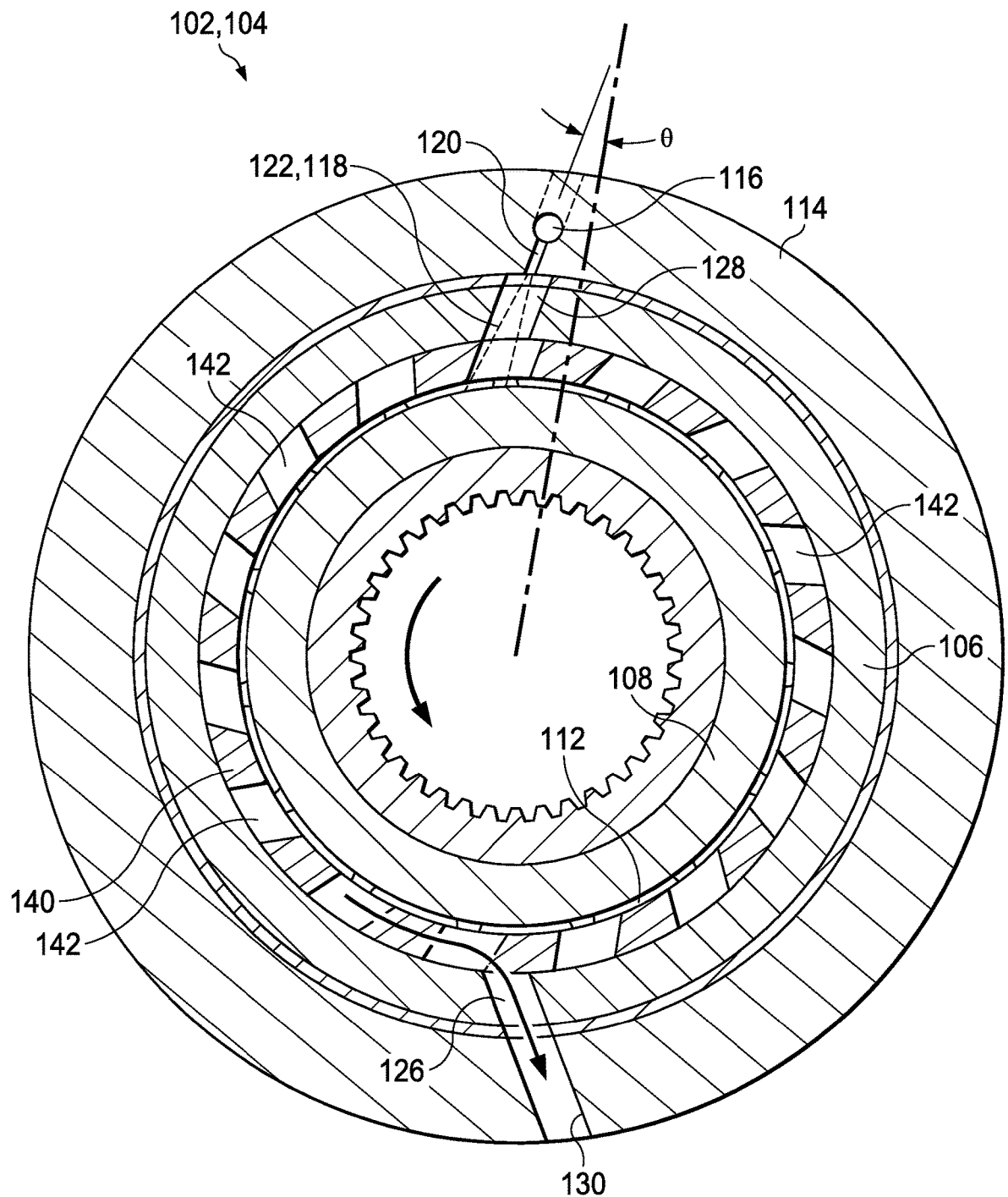
FIG. 4A shows a longitudinal cross-sectional view of an exemplary bearing lubrication system that includes a single flow orifice and exit passageway for distribution of lubricant throughout the duplex bearing and then removal from the system.
Figure 4B:
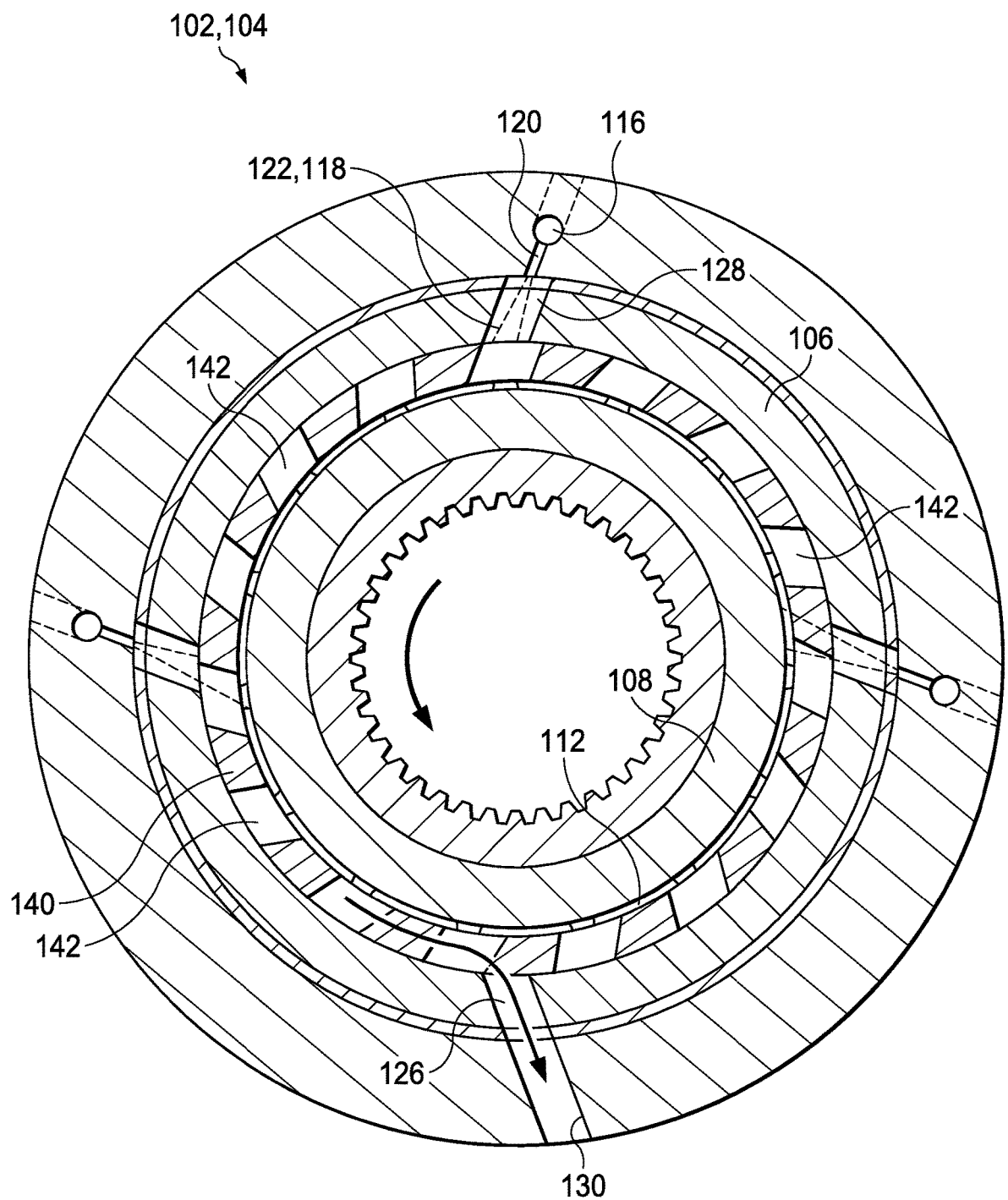
FIG. 4B shows a longitudinal cross-sectional view of an exemplary bearing lubrication system that includes three flow orifices and a single exit passageway for distribution of lubricant throughout the duplex bearing and then removal from the system.

Alternatively, referring to FIGS. 4A and 4B, the flow orifices 120, the entrance slots 128 (when present), and/or the thru-holes 142 in the annular cage 140 may be angled toward a direction of rotation of the inner ring 108 and away from the radial direction; more specifically, downstream ends of the flow orifices 120, the entrance slots 128, and/or the thru-holes 142 may be angled toward the direction of rotation and away from the radial direction by an angle a Such a configuration is shown in FIG. 4A, which shows a bearing assembly 102 having a single flow orifice 120/entrance slot 128 and a single exit slot 126, and in FIG. 4B, which shows a bearing assembly 102 having three flow orifices 120/entrance slots 128 and a single exit slot 126. To faciltate removal of the spent lubricant 118, an upstream end of the exit slot(s) 126 in the outer ring 106 and/or the exit passageway(s) 130 in the housing 114 may be angled toward the direction of rotation and away from the radial direction by the angle θ, which may have any desired value, such as a value less than 90° or, more typically, in a range from 1° to 60° or from 10° to 45°. In addition, although not shown here, one or more of the thru-holes 142 in the annular cage 140 may have an upstream end angled toward the direction of rotation by the angle θ.

Figure 5A:
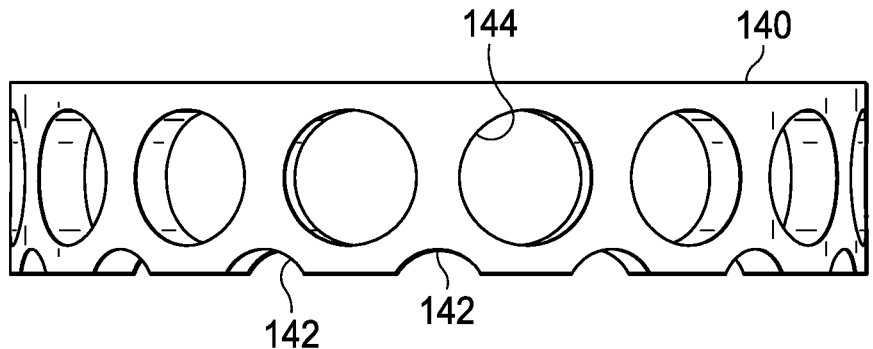
FIGS. 5A-5C show alternative embodiments of an annular cage for use in the duplex bearing, where each schematic shows half of the annular cage prior to assembly with the mating half.
Figure 5B:
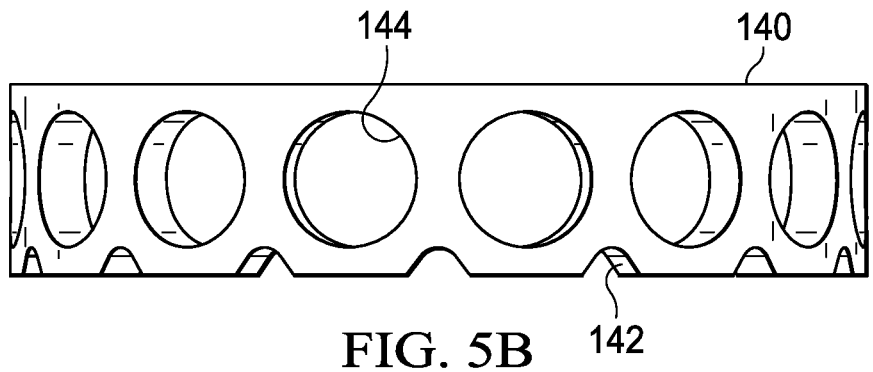
Figure 5C:
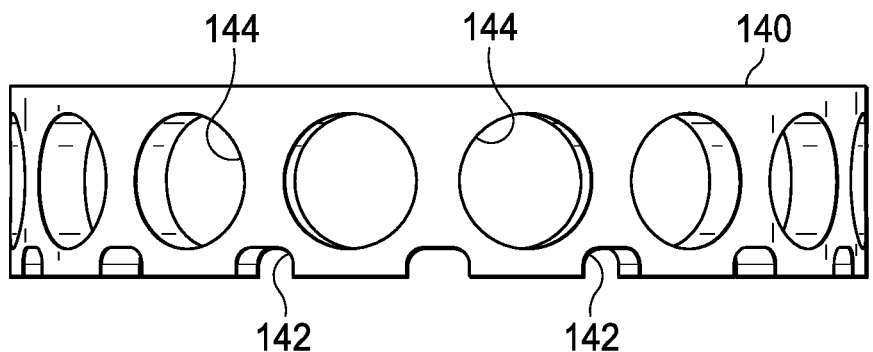

As described above, the annular cage 140 may include a plurality of the circumferentially distributed thru-holes or scallops 142 through which the lubricant jet 122 may pass to reach the inner ring 108, and these thru-holes 142 may have a longitudinal axis that is aligned with the radial direction or angled toward or away from a direction of rotation of the inner ring 108 (e.g., by the angle θ). A transverse cross-section of the thru-holes 142 may further be shaped to promote passage of the lubricant jet 122 therethrough. As shown in FIGS. 5A-5C, the transverse cross-section of the thru-holes 142 may comprise a circle, a polygon with rounded corners, or another curved enclosed shape. FIGS.

Figure 6A:
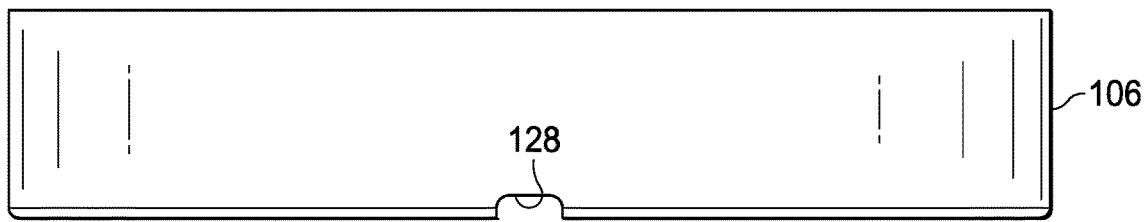
FIGS. 6A-6C show alternative embodiments of an outer ring for use in the duplex bearing, where each schematic shows half of the outer ring prior to assembly with the mating half.
Figure 6B:
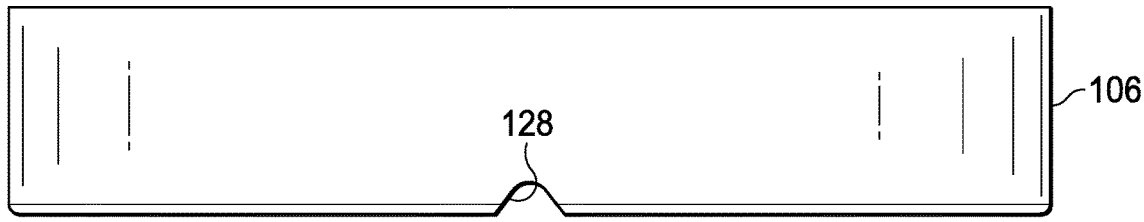
Figure 6C:
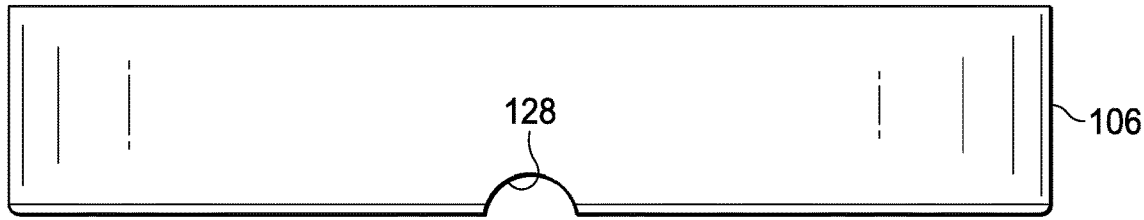

5A-5C illustrate three exemplary embodiments of the annular cage 140 for the duplex bearing 104, where each cage 140 may be constructed from two annular halves and includes "pockets" 144 for containing the rolling elements 112 in addition to the thru-holes 142. Analogously, for embodiments in which the outer ring 106 includes one or more entrance slots 128, a transverse cross-section of the entrance slot(s) 128 may comprise a circle, a polygon with rounded corners, or another curved shape, as illustrated in FIGS. 6A-6C. Like the annular cage 140, the outer ring 106 may be constructed from two annular halves, as shown in the schematics.

Referring to the close-up cross-sectional view of part of the bearing assembly shown in FIG. 7, the two sets 110a, 110b of rolling elements 112 may have an angular contact arrangement where contact angle lines of the two sets 110a,110b of rolling elements 112 diverge in an inward radial direction, as shown. This angular contact arrangement, which may be referred to as a back-to-back arrangement, may be achieved by machining a gap between the two halves of the inner ring 108 such that a preload 150 is obtained when the two halves are clamped together, as illustrated. Such an arrangement may facilitate, as the lubricant 118 is jetted into the duplex bearing 104, pumping of the lubricant 118 from between the sets 110a,110b of rolling elements 112 toward opposing axial directions. An alternative angular contact arrangement for the rolling elements 112 is a face-to-face arrangement where contact angle lines of the two sets 110a,110b of rolling elements 112 converge in an inward radial direction. However, this latter arrangement may not as effectively facilitate pumping of the lubricant 118 from between the two sets 110a,110b of rolling elements 112 toward the opposing axial directions.

In addition to the bearing lubrication system 100, a method of lubricating a duplex bearing 104 is described. Referring again to FIGS. 1A-1D, the method includes jetting a lubricant 118 into a duplex bearing 104 including an outer ring 106, an inner ring 108 positioned radially inward from the outer ring 106, and two sets 110a,110b of circumferentially distributed rolling elements 112 between the inner and outer rings 108,106, where the duplex bearing 104 is part of a bearing assembly 102 including a housing 114 that radially surrounds the duplex bearing 104. The jetting comprises forcing the lubricant 118 through a flow orifice 120 in the bearing assembly 102 that has an axial location between the two sets 110a,110b of rolling elements 112 and is downstream of a lubricant flow passage 116 in the housing 114. The flow orifice 120 may be centered between the two sets 110a,110b of rolling elements 112. As described above, the lubricant flow passage 116 is in fluid communication with a source of the lubricant 118. The method may further include removing spent lubricant 118 from the duplex bearing 104 through one or more exit slots 126 in the outer ring 106 and/or through side gaps 124 between the outer and inner rings 106,108. Spent lubricant passing through the one or more exit slots 126 may be expelled from the bearing assembly 102 through one or more exit passageways 130 in the housing 114.

The duplex bearing 104 may include an annular cage 140 between the inner and outer rings 108,106 to maintain a predetermined axial and circumferential spacing between the rolling elements 112. The annular cage 140 may comprise a plurality of circumferentially distributed thru-holes 142 for passage of the jetted lubricant 118, where the thru-holes 142 may have an axial location between (e.g., centered between) the two sets 110a,110b of rolling elements 112. The bearing assembly 100, duplex bearing 102, housing 114 and associated components (e.g., annular cage 140) employed in the method may have any of the characteristics and/or properties set forth above. For example, the flow orifice 120 may be located within the outer ring 106, as shown in FIG. 2. Alternatively, the flow orifice 120 may be located in the housing 114, as shown in FIG. 1B, or in a liner 132 between the housing 114 and the outer ring 106, as shown in FIG. 3, in which case the flow orifice 120 may be upstream of an entrance slot 128 in the outer ring 106. The lubricant 118 may be jetted into the duplex bearing 104 in a radial direction, e.g., when a longitudinal axis of the flow orifice 120 is aligned with the radial direction. Alternatively, the lubricant 118 may be jetted into the duplex bearing 104 at an angle with respect to the radial direction, e.g., when a downstream end of the flow orifice 120 is angled toward a direction of rotation of the inner ring 108 and away from the radial direction by the angle 8 described above. The lubricant 118 may be jetted into the duplex bearing 104 at a plurality of circumferential locations, facilitated by the presence of a plurality of the flow orifices 120 in the bearing assembly 102, as described above. The rolling elements 112 may have an angular contact arrangement, as shown in FIG. 7, configured to facilitate pumping of the lubricant 118 from between the sets 110a,110b of rolling elements 112 toward opposing axial directions.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a bearing lubrication system comprising: a bearing assembly comprising: a duplex bearing including an outer ring, an inner ring positioned radially inward from the outer ring, and two sets of circumferentially distributed rolling elements between the inner and outer rings; a housing radially surrounding the duplex bearing, the housing including a lubricant flow passage in fluid communication with a source of lubricant; and a flow orifice located downstream of the lubricant flow passage for jetting the lubricant into the duplex bearing, the flow orifice having an axial location between the two sets of rolling elements.

A second aspect relates to the bearing lubrication system of the first aspect, wherein the flow orifice is located in the outer ring.

A third aspect relates to the bearing lubrication system of the first or second aspect, wherein the flow orifice is located in the housing or in a liner between the housing and the outer ring, the flow orifice being upstream of an entrance slot in the outer ring.

A fourth aspect relates to the bearing lubrication system of any preceding aspect, wherein the flow orifice is aligned with a radial direction of the duplex bearing.

A fifth aspect relates to the bearing lubrication of any preceding aspect, wherein a downstream end of the flow orifice is angled toward a direction of rotation of the inner ring and away from a radial direction of the duplex bearing.

A sixth aspect relates to the bearing lubrication system of any preceding aspect, wherein the outer ring includes one or more exit slots, and wherein the housing includes one or more exit passageways downstream of the one or more exit slots for expelling spent lubricant from the bearing assembly.

A seventh aspect relates to the bearing lubrication system of any preceding aspect, wherein the bearing assembly includes a plurality of the flow orifices.

A eighth aspect relates to the bearing lubrication system of any preceding aspect, wherein the duplex bearing further comprises an annular cage between the inner and outer rings for maintaining a predetermined axial and circumferential spacing between the rolling elements, the annular cage comprising a plurality of circumferentially distributed thru-holes for passage of the lubricant, the thru-holes having an axial location between the two sets of rolling elements.

A ninth aspect relates to the bearing lubrication system of any preceding aspect, wherein the two sets of rolling elements have an angular contact arrangement.

A tenth aspect relates to the bearing lubrication system of the ninth aspect, wherein contact angle lines of the two sets of rolling elements diverge in an inward radial direction.

An eleventh aspect relates to the bearing lubrication system of the ninth aspect, wherein contact angle lines of the two sets of rolling elements converge in an inward radial direction.

A twelfth aspect relates to a method of lubricating a duplex bearing, the method comprising: jetting a lubricant into a duplex bearing including an outer ring, an inner ring positioned radially inward from the outer ring, and two sets of circumferentially distributed rolling elements between the inner and outer rings, the duplex bearing being part of a bearing assembly including a housing radially surrounding the duplex bearing, the housing including a lubricant flow passage in fluid communication with a source of the lubricant, wherein the jetting comprises: forcing the lubricant through a flow orifice in the bearing assembly, the flow orifice being downstream of the lubricant flow passage and having an axial location between the two sets of rolling elements.

A thirteenth aspect relates to the method of the twelfth aspect, further comprising removing spent lubricant from the duplex bearing through one or more exit slots in the outer ring, and expelling the spent lubricant from the bearing assembly through one or more exit passageways in the housing downstream of the one or more exit slots.

A fourteenth aspect relates to the method of the twelfth or the thirteenth aspects, wherein the flow orifice is located within the outer ring.

A fifteenth aspect relates to the method of the twelfth or the thirteenth aspects, wherein the flow orifice is located in the housing or in a liner between the housing and the outer ring, the flow orifice being upstream of an entrance slot in the outer ring.

A sixteenth aspect relates to the method of any of the twelfth through the fifteenth aspects, wherein the lubricant is jetted into the duplex bearing in a radial direction, the flow orifice being aligned with the radial direction.

A seventeenth aspect relates to the method of any of the twelfth through the sixteenth aspects, wherein the lubricant is jetted into the duplex bearing at an angle with respect to the radial direction, a downstream end of the flow orifice being angled toward a direction of rotation of the inner ring and away from the radial direction.

An eighteenth aspect relates to the method of any of the twelfth through the seventeenth aspects, wherein the lubricant is jetted into the duplex bearing at a plurality of circumferential locations, the bearing assembly including a plurality of the flow orifices.

A nineteenth aspect relates to the method of any of the twelfth through the eighteenth aspects, wherein the duplex bearing further comprises an annular cage between the inner and outer rings for maintaining a predetermined axial and circumferential spacing between the rolling elements, the annular cage comprising a plurality of circumferentially distributed thru-holes for passage of the jetted lubricant, the thru-holes having an axial location between the two sets of rolling elements.

A twentieth aspect relates to the method of any of the twelfth through the nineteenth aspects, wherein the two sets of rolling elements have an angular contact arrangement, and wherein, as the lubricant is jetted into the duplex bearing, the angular contact arrangement facilitates pumping of the lubricant from between the set of rolling elements toward opposing axial directions.

In addition to the features mentioned in each of the independent aspects enumerated above, some examples may show, alone or in combination, the optional features mentioned in the dependent aspects and/or as disclosed in the description above and shown in the figures.

What is claimed is:

1. A bearing lubrication system comprising:
   a bearing assembly comprising:
      a duplex bearing including an outer ring, an inner ring positioned radially inward from the outer ring, two sets of circumferentially distributed rolling elements between the inner and outer rings, and an annular cage between the inner and outer rings for maintaining a predetermined axial and circumferential spacing between the rolling elements;
      a housing radially surrounding the duplex bearing, the housing including a lubricant flow passage in fluid communication with a source of lubricant; and
      a flow orifice located downstream of the lubricant flow passage for jetting the lubricant into the duplex bearing, the flow orifice having an axial location between the two sets of rolling elements.
   wherein the annular cage comprises a plurality of circumferentially distributed thru-holes for passage of the lubricant, the thru-holes having an axial location between the two sets of rolling elements.

2. The bearing lubrication system of claim 1, wherein the flow orifice is located in the outer ring.

3. The bearing lubrication system of claim 1, wherein the flow orifice is located in the housing or in a liner between the housing and the outer ring, the flow orifice being upstream of an entrance slot in the outer ring.

4. The bearing lubrication system of claim 1, wherein the flow orifice is aligned with a radial direction of the duplex bearing.

5. The bearing lubrication system of claim 1, wherein a downstream end of the flow orifice is angled toward a direction of rotation of the inner ring and away from a radial direction of the duplex bearing.

6. The bearing lubrication system of claim 1, wherein the outer ring includes one or more exit slots, and
wherein the housing includes one or more exit passageways downstream of the one or more exit slots for expelling spent lubricant from the bearing assembly.

7. The bearing lubrication system of claim 1, wherein the bearing assembly includes a plurality of the flow orifices.

8. The bearing lubrication system of claim 1, wherein the two sets of rolling elements have an angular contact arrangement.

9. The bearing lubrication system of claim 8, wherein contact angle lines of the two sets of rolling elements diverge in an inward radial direction.

10. The bearing lubrication system of claim 8, wherein contact angle lines of the two sets of rolling elements converge in an inward radial direction.

11. A method of lubricating a duplex bearing, the method comprising:
jetting a lubricant into a duplex bearing including an outer ring, an inner ring positioned radially inward from the outer ring, two sets of circumferentially distributed rolling elements between the inner and outer rings, and an annular cage between the inner and outer rings for maintaining a predetermined axial and circumferential spacing between the rolling elements, the duplex bearing being part of a bearing assembly including a housing radially surrounding the duplex bearing, the housing including a lubricant flow passage in fluid communication with a source of the lubricant, and the annular cage comprising a plurality of circumferentially distributed thru-holes having an axial location between the two sets of rolling elements, wherein the jetting comprises:
forcing the lubricant through a flow orifice in the bearing assembly, the flow orifice being downstream of the lubricant flow passage and having an axial location between the two sets of rolling elements.

12. The method of claim 11, further comprising removing spent lubricant from the duplex bearing through one or more exit slots in the outer ring; and
expelling the spent lubricant from the bearing assembly through one or more exit passageways in the housing downstream of the one or more exit slots.

13. The method of claim 11, wherein the flow orifice is located within the outer ring.

14. The method of claim 11, wherein the flow orifice is located in the housing or in a liner between the housing and the outer ring, the flow orifice being upstream of an entrance slot in the outer ring.

15. The method of claim 11, wherein the lubricant is jetted into the duplex bearing in a radial direction, the flow orifice being aligned with the radial direction.

16. The method of claim 11, wherein the lubricant is jetted into the duplex bearing at an angle with respect to the radial direction, a downstream end of the flow orifice being angled toward a direction of rotation of the inner ring and away from the radial direction.

17. The method of claim 11, wherein the lubricant is jetted into the duplex bearing at a plurality of circumferential locations, the bearing assembly including a plurality of the flow orifices.

18. The method of claim 11, wherein the two sets of rolling elements have an angular contact arrangement, and
wherein, as the lubricant is jetted into the duplex bearing, the angular contact arrangement facilitates pumping of the lubricant from between the set of rolling elements toward opposing axial directions.

19. A bearing lubrication system comprising:
a bearing assembly comprising:
a duplex bearing including an outer ring, an inner ring positioned radially inward from the outer ring, and two sets of circumferentially distributed rolling elements between the inner and outer rings;
a housing radially surrounding the duplex bearing, the housing including a lubricant flow passage in fluid communication with a source of lubricant; and
a flow orifice located downstream of the lubricant flow passage for jetting the lubricant into the duplex bearing, the flow orifice having an axial location between the two sets of rolling elements,
wherein the flow orifice is located in the housing or in a liner between the housing and the outer ring, the flow orifice being upstream of an entrance slot in the outer ring.

* * * * *